United States Patent Office 3,497,359
Patented Feb. 24, 1970

3,497,359
CULTURED WHEY PRODUCT AND PROCESS FOR PRODUCING THE SAME
Herbert R. Peer, Storm Lake, Iowa, assignor to Ferma Gro Corporation, a corporation of Iowa
No Drawing. Continuation-in-part of application Ser. No. 379,715, July 1, 1964. This application Sept. 21, 1967, Ser. No. 669,412
Int. Cl. A23k 1/08, 1/16
U.S. Cl. 99—9
6 Claims

ABSTRACT OF THE DISCLOSURE

The cultured whey product is produced by adjusting any natural whey product to form a basic culture media having 5% to 7% whey solids, .2% to .4% acidity, 2% to 4% sugar, and 6.1 to 6.6 pH; treating the basic culture media with cobalt carbonate and di-ammonium phosphate; inoculating the basic culture media with live *Lactobacillus acidophilus* organisms which have been treated with cobalt carbonate; maintaining the base culture media at 100 degrees F. until the pH of 3.8 to 4.1 is attained; adding cobalt carbonate and dibasic ammonium phosphate to the solution; and stabilizing the solution by adding cobalt carbonate, ferrous lactate and lactic acid.

---

This application is a continuation-in-part of applicant's previous application having Ser. No. 379,715 now U.S. Pat. No. 3,343,962 and having a filing date of July 1, 1964.

This invention relates to a cultured whey product formulated to incorporate specific base cultures into grain carriers for use particularly as a livestock feed supplement.

It has been known for some time that the bacteria lactobacillus, and more specifically *Lactobacillus acidophilus* has a beneficial and favorable effect upon the health of animals when inserted in their intestinal track. Therefore, it becomes extremely desirable to provide a cultured product which contains this beneficial bacteria and which may be fed to animals. However, due to the fact that these bacteria produce a high concentration of lactic acid and due to the fact that this acid concentration is lethal to a major portion of the *Lactobacillus acidophilus*, it has been quite difficult to sustain a high concentration of these bacteria in a culture for extended periods of time. This difficulty is even more pronounced when *Lactobacillus acidophilus* is introduced into a milk product solution because in such a solution it is extremely active. A large quantity of lactic acid is produced rather quickly and, as a result the bacteria arrests itself after a short period of activity. This intrinsic arrestment characteristic of the bacteria has, until applicant's invention, made the production of a cultured whey product containing substantial concentrations of live *Lactobacillus acidophilus* extremely difficult, if not impossible.

Applicant has found that the treatment of *Lactobacillus acidophilus* with cobalt carbonate causes the bacteria to thrive in a highly acidic environment. One of the advantages derived from this invention is that the bacteria can be maintained in a starter mixture of low pH for addition to a base media having a high pH. The mixture of a starter and a base media having this relationship permits the organism to produce more acid for enhancing the fermentation process. A second advantage is that the fermentation mixture can be maintained at a low pH value of 4.5 or below, thereby presenting a lethal environment for many contaminating organisms. The third advantage of cobalt carbonate treatment is that the bacteria has a shelf life of six months or more which is much longer than the shelf life of the untreated bacteria. The longer shelf life makes manufacture of a cultured whey product much less expensive due to the greater ease with which stock cultures may be maintained.

The cultured whey product produced by applicant's process is extremely beneficial when fed to animals. Their health improves, they become less nervous and are more easily controlled, and they gain weight with a substantial reduction in feeding costs.

Therefore, it is one of the objects of this invention to provide a cultured whey product wherein sweet whey has been inoculated with suitable organisms which utilize sugar residues to build enzyme systems, growth factors, and other unidentified bio-chemical intermediates.

Another object of this invention is to provide a cultured whey product wherein further base nutrients have been added to a balanced system for the purpose of concentrating a maximum organism density under available energy supply.

A still further object of this invention is to provide a cultured whey product wherein substantial quantities of lactic acid are produced for the stabilization of the balanced systems and to further inhibit the growth of any foreign organisms.

A further object of this invention is to provide a cultured whey product produced by inoculation of a strain of *Lactobacillus acidophilus* which will thrive in a highly acidic media.

A further object of this invention is to provide a cultured whey product wherein a starter organism of a low pH value has been added to a base media having a high pH value, thereby causing the organism to produce acid at a higher rate than normal to enhance the fermentation process.

A further object of this invention is to provide a cultured whey product which, when fed to animals, will substantially improve their health.

A further object of this invention is to provide a cultured whey product which, when fed to animals, will substantially improve their growth rate.

A further object of this invention is to provide a cultured whey product wherein a starter is sufficiently strong so that it need not function in a sterilized media.

The process for producing the cultured whey product of this invention can be described in five separate phases which are:

(I) Producing a Whey Starter Microorganism.
(II) Developing a Basic Culture Media.
(III) Inoculating the Basic Culture Media with Starter Culture to form a Primary Culture.
(IV) Adding Nutrients to the Primary Culture to form a secondary culture.
(V) Final Processing and Stabilizing of the secondary culture to form a Final Base Cultured Whey Product.

(I) PRODUCING A WHEY STARTER MICROORGANISM

The first phase of applicant's process for producing a cultured whey product involves the developing of a starter culture containing *Lactobacillus acidophilus* and cobalt carbonate ($CoCO_3$). An example of how this starter is produced is given in the four steps described below.

(A) Developing an initial culture of *Lactobacillus acidophilus* treated with cobalt carbonate (1) Treat 500 ml. grade A skim milk with 50 milligrams cobalt carbonate ($CoCO_3$) [100 p.p.m.] and sterilize. Sterilization is accomplished by putting the solution in a flask and placing the flask in an autoclave (or pressure cooker) for 20 minutes at 5 p.s.i. The preferred range of cobalt carbonate is 80 to 120 p.p.m., and the permissive range is 5 p.p.m. to 1000 p.p.m., but the extreme limits of this permissive range would invite possible production difficulties.

(2) Cool the sterile milk solution to 78 degrees F. and inoculate with 2 grams of commercial dried (dri-vac) *Lactobacillus acidophilus*. Then incubate at 100 degrees F. for 24 hours.

This material is then transferred in accordance with the procedure for carrying culture stocks until a live organism density of 150 to 200 million organisms per milliliter is obtained, in a 24 hour period at 1.3% to 1.6% acidity.

(B) Producing stock cultures from the initial culture

This involves a method or routine for carrying and maintaining a continuous inventory of live *Lactobacillus acidophilus*. Assuming that the 500 ml. initial culture of step A is available, the process for producing a stock culture is as follows:

Five 100 ml. samples of grade A skim milk are placed in 125 ml. Erlenmeyer flasks. Each 100 ml. sample is treated with 10 milligrams cobalt carbonate ($CoCO_3$) and stoppered securely with cotton gauze.

All five samples are then placed in an autoclave (or pressure cooker) for 20 minutes at 5 p.s.i. The five sterilized samples are cooled to 100 degrees F. and each is inoculated with 10 ml. (100 degrees F.) of the initial culture, observing the usual precautions in making bacterial transfers.

The five inoculated stocks are then cultured at 100 degrees F. for 24 hours to develop their bacterial densities. The five flasks, each containing 110 ml. of stock culture, are numbered 1 to 5 and placed under refrigeration (36 degrees to 38 degrees F.) until they are used in the pre-starter operation, infra.

(C) Producing pre-starter culture from stock culture

The following events take place in the preparation of two 500 ml. quantities of pre-starter:

(1) Two 100 ml. samples of fresh grade A skim milk each treated with 10 milligrams cobalt carbonate ($CoCO_3$) are sterilized as before and then are cooled to 100 degrees F.

(2) Each 100 ml. sample is inoculated with 10 ml. each of two stocks from the refrigerator, after warming to 100 degrees F. so that two freshly inoculated stocks are ready for 24 hour culture at 100° F. to replace the ones just used as inoculants. The remaining 100 ml. of each of these two stocks will be used to inoculate the pre-starter culture.

(3) Two 400 ml. batches of grade A skimmed milk are placed in two flasks and treated with 50 mlg. of $CoCO_3$, and this solution is sterilized in an autoclave at 5 p.s.i. for 20 minutes. It is then cooled to approximately 100 degrees F. and 100 ml. of the stock culture is added to each flask. Each 500 ml. flask is then placed in an oven at 100 degrees F. for approximately 24 hours and cultured to an organism density of 150 to 200 million organisms per ml. and 1.5 to 1.7% acidity and to a pH of 3.8 to 4.1.

These flasks now each contain 500 ml. of the pre-starter culture.

(D) Producing whole milk starter culture from pre-starter culture

The following is the procedure for producing one gallon of starter from 500 ml. of pre-starter: One gallon of whole milk is treated with 1 gram $CoCO_3$ (cobalt carbonate) at room temperature. This material is inoculated with the 500 ml. pre-starter culture and incubated at 100 degrees F. for 24 hours or until a live organism density of 150 to 200 million organisms per milliliter has been attained. In this manner one gallon of whole milk starter culture is made ready to be used in the inoculation of a basic culture media.

(II) DEVELOPING A BASIC CULTURE MEDIA

This step involves preliminary adjustment of any commercially available natural whey product so that it can be used as a base media for applicant's cultured whey product. These natural whey products can be adjusted by processes well known in the art to meet the following initial constituent requirements.

TABLE I

| | | |
|---|---|---|
| Whey solids | percent | 5 to 7 |
| Acidity | do | .2 to .4 |
| Sugar (lactose) | do | 2 to 4 |
| pH | | 5.5 to 6.3 |

One example of this step is the preparation of a dried whey product containing

TABLE II

| | Percent |
|---|---|
| Solids | 92 |
| Acidity | 5 |
| Sugar | 65 |

This dried whey product is diluted into tap water at a ratio of one part whey to 12 parts water (by weight) to establish the basic culture media of Table I. To complete the preparations of the basic culture media, cobalt carbonate ($CoCO_3$) must be added at a ratio of 65 parts per million and di-ammonium phosphate $(NH_4)_2HPO_4$ must be added at a ratio of 400 parts per million. The permissive range of cobalt carbonate is 1 to 100 p.p.m. while the preferred range is 45 to 75 p.p.m. with 65 p.p.m. being the best ratio. The permissive range of di-ammonium phosphate is 200 to 800 p.p.m.

(III) INOCULATING THE BASIC CULTURE MEDIA WITH STARTER CULTURE TO FORM A PRIMARY CULTURE

The basic culture media of phase II is heated to a temperature of 100 degrees F. and is then inoculated with the starter culture described in phase I to form a concentration of from 1 to 4% of starter culture in the basic culture media. This inoculated solution is designated as primary culture and is allowed to ferment at 100 degrees F. until a pH value of 3.8 to 4.1 is attained. The fermentation process will take approximately 16 to 24 hours. It should be noted that at this point the *Lactobacillus acidophilus* organism thrives in a highly acidic environment due to its treatment with cobalt carbonate and, as a result, produces more lactic acid, thereby continually lowering the pH of the solution. The low pH of the solution during culturing and incubation is very desirable because it is lethal to contaminating bacteria and therefore initiates a culture in which *Lactobacillus acidophilus* are dominant. The organism density in the primary culture at the end of this incubation period is 500 to 750 million organisms per milliliter.

(IV) ADDING NUTRIENTS TO THE PRIMARY CULTURE TO FORM A SECONDARY CULTURE

This secondary culture phase is concerned with the addition and concentration of specific nutrients and their elaboration by microorganisms under carefully controlled conditions until a finished culture of desired properties is developed. The full phase takes approximately nine days. The nutrients are added at specific levels during the first three days in accordance with the nutrient schedule outlined below:

FIRST DAY

| | Best Ratio | Preferred Range | Permissive Range |
|---|---|---|---|
| 9:00 a.m.: | | | |
| a. $CoCO_3$ p.p.m | 65 | 45–75 | 1–100 |
| b. $(NH_4)_2HPO_4$, p.p.m | 400 | 300–600 | 200–800 |
| c. Dried whey soilds, percent | 2 | 1.5–2.5 | 1–4 |
| 1:00 p.m.—Same as 9:00 a.m. first day. | | | |
| 4:00 p.m.—Same as 9:00 a.m. first day. | | | |

SECOND DAY

9:00 a.m.—Same as 9:00 a.m. first day.
1:00 p.m.—Same as 9:00 a.m. first day.
4:00 p.m.—Same as 9:00 a.m. first day.

THIRD DAY

9:00 a.m.—Same as 9:00 a.m. first day.
1:00 p.m.—Same as 9:00 a.m. first day.
4:00 p.m.—Same as 9:00 a.m. first day.

NOTE.—It should be noted that the 400 p.p.m. $(NH_4)_4$ should always be proportional to 2% whey solids.

The temperature is always maintained at 100 degrees F. and nutrients are added with mild agitation so as to minimize the introduction of oxygen. The pH is maintained at 3.9 to 4.7 by the addition of ammonium hydroxide ($NH_4OH$) and is never allowed to develop outside this range. The preferable manner of operation is to work at the lower end of this pH range for the first day and gradually proceed toward 4.3 at the end of the third day.

On the fifth day the temperature is lowered to 95 degrees F. and maintained at this level until the seventh day when it is lowered to 90 degrees F. The solution is now designated as the secondary culture and is held at this temperature until the ninth day at which time the finished secondary culture should have the following properties:

pH _____ 4.2 to 4.3
Percent acidity _____ 3.0 to 3.5
Percent reducing sugar _____ 2.5 to 3.0
Organism density, million-milliliter _____ 500 to 700
Baumé—hydrometer reading, degrees _____ 9 to 10

The percentage of solids will have reached approximately 17–20%, but could be 3–25% depending on the feeding schedule.

(V) FINAL PROCESSING AND STABILIZING OF THE SECONDARY CULTURE TO FORM A FINAL BASE CULTURAL WHEY PRODUCT

The final phase of applicant's process involves stabilizing the secondary culture and putting it in the desired form for use as an animal feed supplement.

The first step in this phase is to develop a Final Base A. This is done by:

(1) Adding .25% by weight of $CoCO_3$ with agitation and blending until its reaction with the secondary culture is complete.

(2) Adding .75% by weight of $Fe(C_3H_5O_3)$ ferrous lactate and blending until thoroughly mixed.

This product is designated as Final base A and for some purposes Final Base A may be used directly for feeding animals. One example of such use might be to spray the cultured Final Base A directly into various organic binder and foodstuffs at concentrations of 1 to 3% for distribution in feed rations. Another possible use for Final Base A is to spray it directly or in a water solution onto the leaves of a variety of vegetation for the purpose of leaf feeding.

Sometimes, however, a final base with higher whey solids content and higher percentage acidity is desirable, and may be developed by utilizing either liquid condensed sour whey solids or dried whey solids. Final Base B and Final Base C are examples of this further adaptation of Final Base A.

Final Base B is developed by blending 3 parts condensed sour whey (having 55% solids) with 5 parts Final Base A by weight and adjusting the resulting mixture with technical grade lactic acid to 10 to 12% acidity. The resulting Final Base B has the following properties:

(a) 10% to 12% acidity
(b) 3.4 to 3.6 pH
(c) 18 degrees to 19 degrees Baumé hydrometer reading
(d) Stable shelf life of over two years.

A dry cultured whey product may be manufactured by mixing equal parts of Final Base B with wheat bran or other suitable organic carrier, and then drying the mixture to remove excess moisture.

Final Base C is developed by blending 1 part dried whey with 10 parts Final Base A by weight, and adjusting the acidity of the mixture with technical grade lactic acid to give the mixture the following properties:

(a) 10% to 12% acidity
(b) 3.4 to 3.6 pH
(c) 14 degrees to 15 degrees Baumé hydrometer reading
(d) Stable shelf life of over two years.

As before, this Final Base C may be sprayed or mixed into a variety of organic binders.

The product developed by the process described above has been found to be extremely beneficial to animals. Adjusting the acidity to the range described above anesthetizes the *Lactobacillus acidophilus* and achieves the resulting stable shelf life of the product. When fed this product, the health of the animals improves and they become less nervous. The animals are also more easily controlled and they gain weight with a substantial reduction in feeding costs. The results obtained by this product are directly related to the treating of *Lactobacillus acidophilus* cobalt carbonate. Thus it can be seen that this invention accomplishes at least all of its stated objectives.

Some changes may be made in the construction and arrangement of my cultured whey product and process for producing the same without departing from the real spirit and purpose of my invention, and it is my intention to cover by my claims, any modified forms of structure or use of mechanical equivalents which may be reasonably included within their scope.

I claim:

1. A lactic acid fermentation product produced by fermenting a milk nutrient media with *Lactobacillus acidophilus* organisms in the presence of cobalt carbonate in an amount sufficient to enable said organisms to develop resistance to high acidity.

2. The product of claim 1 wherein said *Lactobacillus acidophilus* organisms are stabilized by the addition of lactic acid to retard their growth and to give said product an increased shelf life.

3. The product of claim 1 wherein said *Lactobacillus acidophilus* exists in a concentration of at least between 500 to 700 million organisms per milliliter.

4. The product of claim 1 wherein said product has a pH of between 3.4 and 3.6.

5. The product of claim 1 wherein said nutrient media contains sugar fermentable by said *Lactobacillus acidophilus* organisms.

6. The product of claim 1 wherein the product results from said fermentation taking place in a pH range of 3.4 to 4.7.

References Cited

UNITED STATES PATENTS

| | | | |
|---|---|---|---|
| 1,918,042 | 7/1933 | Nitardy et al. | 99—59 |
| 2,765,232 | 10/1956 | Rodgers et al. | 99—57 |
| 3,085,049 | 4/1963 | Rudy et al. | |
| 3,259,500 | 7/1966 | Barnhart et al. | 99—2 |

A. LOUIS MONACELL, Primary Examiner

N. ROSKIN, Assistant Examiner

U.S. Cl. X.R.

99—57, 59; 195—48